(12) United States Patent
Arslan

(10) Patent No.: US 7,277,690 B1
(45) Date of Patent: Oct. 2, 2007

(54) COMMUNICATION APPARATUS INCLUDING A MECHANISM FOR PREVENTING DEMODULATION OF TEXT TELEPHONE INFORMATION DURING POOR SIGNAL RECEPTION

(75) Inventor: Guner Arslan, Austin, TX (US)

(73) Assignee: NXP B.V., Eindhoven (NL)

( * ) Notice: Subject to any disclaimer, the term of this patent is extended or adjusted under 35 U.S.C. 154(b) by 98 days.

(21) Appl. No.: 11/170,548

(22) Filed: Jun. 29, 2005

(51) Int. Cl.
*H04Q 7/20* (2006.01)

(52) U.S. Cl. .................... 455/337; 455/309; 455/550.1

(58) Field of Classification Search ................ 455/403, 455/412.1, 414.4, 414.1, 420, 20, 21, 553.1, 455/158.5, 127.4, 309, 312, 337, 550.1; 379/52, 379/93.15, 93.01, 93.24, 67.11, 67.1; 714/746
See application file for complete search history.

(56) References Cited

U.S. PATENT DOCUMENTS

| | | | |
|---|---|---|---|
| 6,075,841 A * | 6/2000 | Engelke et al. ............... 379/52 |
| 6,434,198 B1 * | 8/2002 | Tarraf .......................... 375/259 |
| 2002/0057765 A1 | 5/2002 | Hyziak | |
| 2003/0053603 A1 | 3/2003 | Vejlgaard | |
| 2005/0170820 A1 * | 8/2005 | Shiomi et al. .............. 455/418 |
| 2005/0237980 A1 * | 10/2005 | Melhuish ..................... 370/335 |
| 2005/0268198 A1 * | 12/2005 | Marke et al. ................ 714/746 |
| 2006/0023848 A1 | 2/2006 | Mohler | |

* cited by examiner

*Primary Examiner*—Jean Gelin
(74) *Attorney, Agent, or Firm*—Peter Zawilski

(57) ABSTRACT

A communication apparatus includes a mechanism for preventing demodulation of text telephone information during reception of a poor quality signal. In one embodiment, the communication apparatus includes a receiver including a demodulator unit configured to receive a signal including a plurality of text telephone symbols. The demodulator unit may be configured to generate a soft decision based upon a frequency and an energy value of each received text telephone symbol. The demodulator unit may be configured to receive a notification that indicates the signal is unusable. In response to receiving the notification, the demodulator unit may be further configured to generate predetermined information that is independent of the plurality of text telephone symbols.

20 Claims, 4 Drawing Sheets

COMMUNICATION APPARATUS INCLUDING A MECHANISM FOR PREVENTING DEMODULATION OF TEXT TELEPHONE INFORMATION DURING POOR SIGNAL RECEPTION

BACKGROUND OF THE INVENTION

1. Field of the Invention

This invention relates to mobile telephony and, more particularly, to demodulation of text telephone data received via a mobile telephone medium.

2. Description of the Related Art

Text Telephone (referred to as TTY in North America) equipment has been used in the fixed telephone network for many years to transmit text and speech through the conventional telephone network. In such systems, a conventional telephone is connected to a terminal and the user enters the characters via a keyboard. Some types of TTY systems the telephone handset may be acoustically coupled to the terminal, while in other types of TTY systems the telephone may be directly connected. The terminal encodes the characters into tones (using a mapping code) which are then transmitted from the terminal through the normal voice path of the conventional telephone. A TTY terminal, in conjunction with a telephone on the receiver side, may decode the tones and display the characters on the terminal display.

In the United States, some cellular telephony systems support TTY services using a Baudot Code to map the characters using two tones: 1400 Hz and 1800 Hz. However, conventional digital cellular systems may not provide satisfactory character error rates for text transmitted in the speech channel using the traditional TTY modulation techniques developed for the fixed network. Thus, a new standard has been created to provide this cellular TTY service. The new standard is commonly referred to as Cellular Text Telephone Modem (CTM). During a call, the received signal may become so distorted or unreliable that it may not be decoded properly by the receiver.

SUMMARY

Various embodiments of a communication apparatus including a mechanism for preventing demodulation of text telephone information during reception of a poor quality signal are disclosed. In one embodiment, the communication apparatus includes a receiver including a demodulator unit configured to receive a signal including a plurality of text telephone symbols. The demodulator unit may be configured to generate a soft decision based upon a frequency and an energy value of each received text telephone symbol. The demodulator unit may be configured to receive a notification that indicates the signal is unusable. In response to receiving the notification, the demodulator unit may be further configured to generate predetermined information that is independent of the plurality of text telephone symbols.

In one specific implementation, the predetermined information is soft decision information including a reliability value that does not correspond to a received text telephone symbol.

In another specific implementation, the text telephone symbols may be symbols that include a plurality of bits encoded according to a cellular text telephone modem (CTM) protocol.

Figure 1:
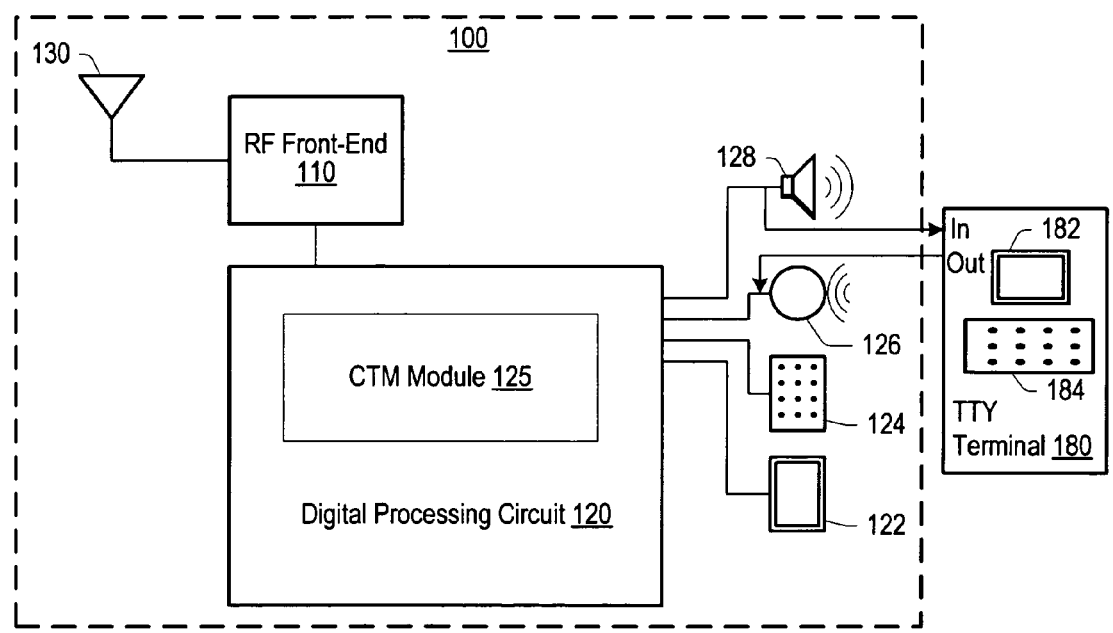
FIG. 1 is a generalized block diagram of one embodiment of a communication apparatus.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a generalized block diagram of a communication apparatus 100 is shown. Communication apparatus 100 includes an RF front-end circuit 110 coupled to a digital processing circuit 120. As shown, various user interfaces including a display 122, a keypad 124, a microphone 126, and a speaker 128 may be coupled to digital processing circuit 120, depending upon the specific application of communication apparatus 100 and its desired functionality. An antenna 130 is also shown coupled to RF front-end circuit 110. It is noted that in various embodiments, communication apparatus 100 may include additional components and/or couplings not shown in FIG. 1 and/or exclude one or more of the illustrated components, depending on the desired functionality. It is further noted that components that include a reference number and letter may be referred to by the reference number alone where appropriate, for simplicity.

Communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, satellite communications, and the like. As such, communication apparatus 100 may provide RF reception functionality, RF transmission functionality, or both (i.e., RF transceiver functionality).

Communication apparatus 100 may be configured to implement one or more specific communication protocols or standards, as desired. For example, in various embodiments communication apparatus 100 may employ a time-division multiple access (TDMA) standard or a code division multiple access (CDMA) standard to implement a standard such as the Global System for Mobile Communications (GSM)

standard, the Personal Communications Service (PCS) standard, and the Digital Cellular System (DCS) standard. In addition, many data transfer standards that work cooperatively with the GSM technology platform may also be supported. For example, communication apparatus 100 may also implement the General Packet Radio Service (GPRS) standard, the Enhanced Data for GSM Evolution (EDGE) standard, which may include Enhanced General Packet Radio Service standard (E-GPRS) and Enhanced Circuit Switched Data (ESCD), and the high speed circuit switched data (HSCSD) standard, among others. In addition, as mentioned above, communication apparatus 100 may implement the emerging Cellular Text Telephone Modem (CTM) standard.

RF front-end circuit 110 may accordingly include circuitry to provide RF reception capability and/or RF transmission capability. In one embodiment, front-end circuit 110 may down-convert a received RF signal to baseband and/or up-convert a baseband signal for RF transmission. RF front-end circuit 110 may employ any of a variety of architectures and circuit configurations, such as, for example, low-IF receiver circuitry, direct-conversion receiver circuitry, direct up-conversion transmitter circuitry, and/or offset-phase locked loop (OPLL) transmitter circuitry, as desired. RF front-end circuit 110 may additionally employ a low noise amplifier (LNA) for amplifying an RF signal received at antenna 130 and/or a power amplifier for amplifying a signal to be transmitted from antenna 130. In alternative embodiments, the power amplifier may be provided external to RF front-end circuit 110.

Digital processing circuit 120 may provide a variety of signal processing functions, as desired, including baseband functionality. For example, digital processing circuit 120 may be configured to perform filtering, decimation, modulation, demodulation, coding, decoding, correlation and/or signal scaling. In addition, digital processing circuit 120 may perform other digital processing functions, such as implementation of the communication protocol stack, control of audio testing, and/or control of user I/O operations and applications. To perform such functionality, digital processing circuit 120 may include various specific circuitry, such as a software programmable MCU and/or DSP (not shown), as well as a variety of specific peripheral circuits such as memory controllers, direct memory access (DMA) controllers, hardware accelerators, voice coder-decoders (CODECs), digital audio interfaces (DAI), UARTs (universal asynchronous receiver transmitters), and user interface circuitry. The choice of digital processing hardware (and firmware/software, if included) depends on the design and performance specifications for a given desired implementation, and may vary from embodiment to embodiment.

In the illustrated embodiment, communication apparatus 100 is coupled to a TTY terminal 180. TTY terminal 180 may include a keyboard 184 and a display 182. As such, TTY terminal 180 may provide a means for entering and displaying text characters for transmission as well as displaying received text characters. For example, a user may connect the input of TTY terminal 180 to the audio output of communication apparatus 100 and the output of TTY terminal 180 to the audio input of communication apparatus 100. In one embodiment, the user may enter text via keyboard 184. The text may appear on display 182. In addition, any text that is received by TTY terminal 180 may appear on display 182. In one embodiment, TTY terminal 180 may convert text characters entered by a user into TTY tones according to a Baudot code or other map and then provide those tones to communication apparatus 100. Similarly, TTY terminal 180 may receive and convert the TTY tones to text characters for display.

As shown, digital processing circuit 120 includes a CTM module 125. CTM module 125 may perform signal-processing tasks associated with CTM modulation and demodulation. For example, CTM module 125 may perform tasks such as CTM tone detection. CTM module 125 may enable communication apparatus 100 to be used to send and receive text messages from a standard TTY terminal.

As described above, CTM allows reliable transmission of a text telephone conversation alternating with a speech conversation through the existing speech communication paths in cellular mobile phone systems. CTM maps each text character to 8 bits, which may then be encoded with an error-correction code. This process may generate 32 bits for each character. After the addition of control bits (e.g., mute, resync, and preamble bits) and interleaving, the bits are grouped into pairs. Each pair is represented by a 40-sample sinusoid at one of the following frequencies: 400, 600, 800, and 1000 Hz. The sampling rate is 8000 Hz, thus providing a bit rate over the channel of 2 bits/5 ms=400 bits/sec. Additional details regarding CTM may be found in the latest revision of the CTM specification 3GPP TS 26.226.

Figure 2:
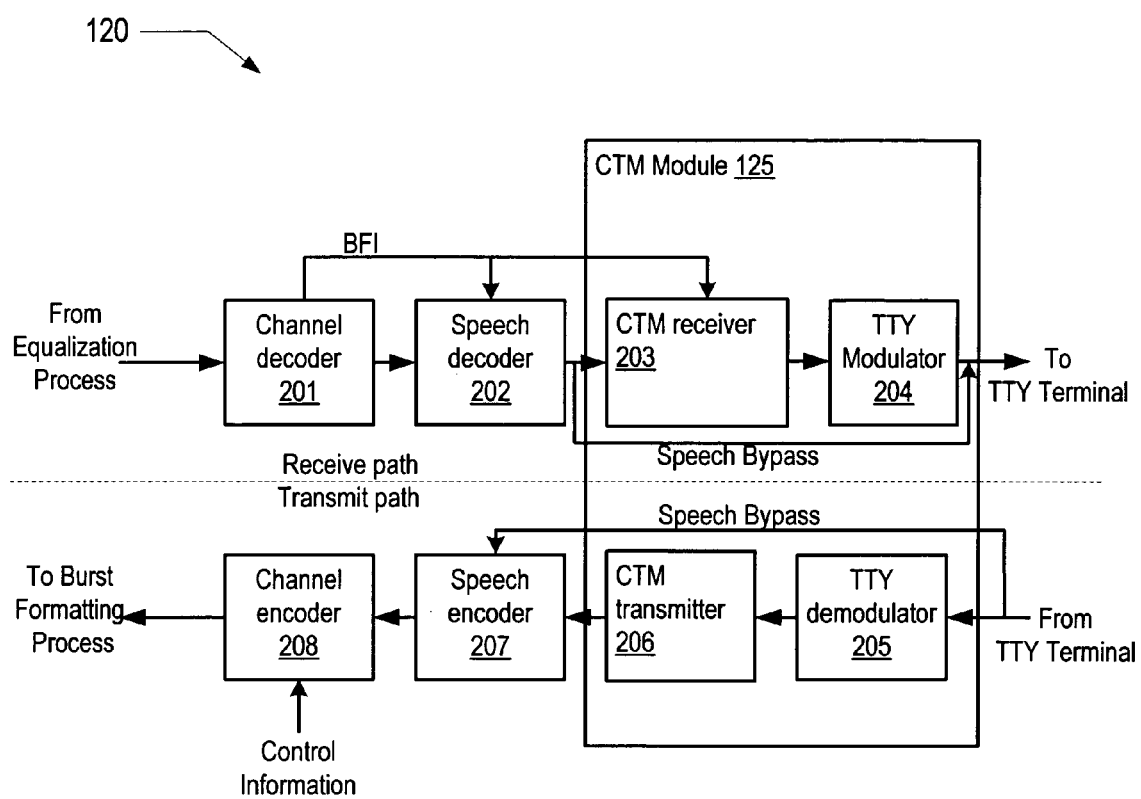
FIG. 2 is a block diagram illustrating specific aspects of one embodiment of the digital processing circuit of FIG. 1.

Referring to FIG. 2, a block diagram illustrating specific aspects of one embodiment of the digital processing circuit of FIG. 1 is shown. Digital processing circuit 120 includes a receive path having a channel decoder 201 coupled to a speech decoder 202. Speech decoder is coupled to CTM module 125, which includes a CTM receiver 203 coupled to a TTY modulator 204. The output of TTY modulator 204 may be provided to a TTY terminal such as TTY terminal 180 of FIG. 1, for example. In addition, CTM module 125 includes transmit path having a TTY demodulator 205 coupled to a CTM transmitter 206. CTM transmitter 206 is coupled to speech encoder 207, which is in turn coupled to channel encoder 208. It is noted that other components within digital processing circuit 120 are not shown for simplicity.

In the receive path, in one embodiment, channel decoder 201 may receive channel-equalized soft symbol data from an equalization process. Channel decoder 201 may provide a number of bits to speech decoder 202, which may create speech samples in groups of 160 pulse code modulated (PCM) samples.

Figure 3:
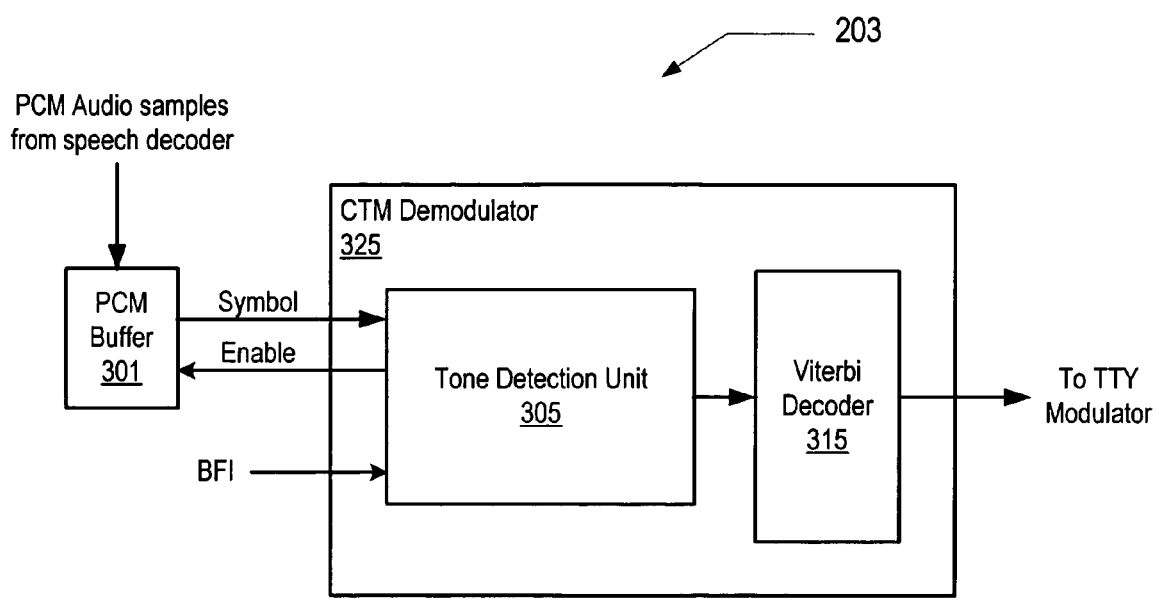
FIG. 3 is a block diagram illustrating one embodiment of the CTM receiver of FIG. 2.

Speech decoder 202 may store the PCM samples in a buffer (shown in FIG. 3). The CTM receiver 203 may determine whether the samples are text telephone samples (e.g., CTM symbols) or normal speech samples. If the speech samples contain no text telephone data, the CTM module 125 and its associated CTM processing may be bypassed. However, if CTM receiver 203 determines that the samples are CTM symbols, as will described in greater detail below in conjunction with the descriptions of FIG. 3 and FIG. 4, CTM receiver 203 includes a CTM demodulator 225 that may demodulate the samples in the buffer into soft symbols, 40 samples at a time. The soft symbols may be de-interleaved and decoded by, for example, a Viterbi decoder (shown in FIG. 3), into bits which may then be grouped into eight bit groups and mapped back into characters. The characters may be modulated by TTY modulator 204 into TTY tones according to the Baudot code or other suitable mapping. The TTY modulated signal may be provided to a TTY terminal such as TTY terminal 180 of FIG. 1, for example.

In addition, during the channel decode process, channel decoder 201 may detect bad frames. For example, the received signal may include uncorrectable errors or the signal may be so distorted that it cannot be decoded. In such cases, channel decoder 201 may provide a bad frame indicator (BFI) signal to speech decoder 202, and to CTM module 125.

For the normal voice path, the speech decoder 202 may be configured to enhance the signal to make the bad frames less noticeable to a listener. For example, speech decoder 202 may replace the bad voice data with comfort noise such as Gaussian or white noise. However, such enhancements may not be possible for CTM symbol data. As described in greater detail below, CTM receiver 203 may receive the BFI signal and in one embodiment, may provide a predetermined information for further decoding.

In the transmit path, in one embodiment, a TTY terminal (e.g., TTY terminal 180 of FIG. 1), may provide a TTY modulated signal that includes text characters encoded into tones that are mapped using a Baudot code, for example. The TTY modulated signal may be demodulated into character bits by TTY demodulator 205. CTM transmitter 206 may create symbol bits by generating error correcting code bits such as a forward error correcting code (FEC) bits and control bits, and adding them to each character bit. CTM transmitter 206 may group the symbol bits into bit pairs and depending on the value of each bit pair, generate a 40-sample sinusoid having one of the CTM frequencies described above. If both bit 0 and bit 1 are marked to be muted, a sequence of 40 zero-valued samples may be generated. Table 1 illustrates the bit pair/frequency map used by a CTM modulator. These CTM sinusoid samples may be placed into a buffer in groups of four, encoded by the speech encoder 207 and the channel encoder 208, and provided to a burst formatting process for transmission. Similar to the receive path, the CTM path may be bypassed if the speech data is voice data and has no CTM or text telephone content.

TABLE 1

CTM bit pair/frequency map

|  | bit 1 = 0 | bit 1 = 1 | bit 1 = muted |
| --- | --- | --- | --- |
| bit 0 = 0 | 400 Hz | 600 Hz | 600 Hz |
| bit 0 = 1 | 800 Hz | 1000 Hz | 1000 Hz |
| bit 0 = muted | 800 Hz | 1000 Hz | Zero samples |

Referring to FIG. 3, a block diagram illustrating one embodiment of the CTM receiver of FIG. 2 is shown. CTM receiver 203 includes a PCM buffer 301 that is coupled to a tone detection unit 305 within CTM demodulator 325. CTM demodulator 325 also includes a Viterbi decoder 315 that is coupled to the output of tone detection unit 305.

In one embodiment, tone detection unit 305 may be configured to receive speech samples from PCM buffer 301, 40 samples at a time. Tone detection unit 305 may be configured to detect the CTM tones and convert the tones into corresponding bit pairs that may be represented as soft decisions. As described above, CTM symbols are transmitted as bit pairs represented as 40-sample sinusoids at one of four frequencies (tones). Tone detection unit 305 may provide the soft decisions to Viterbi decoder 315 for further decoding. In one specific implementation, the soft decisions provided to Viterbi decoder 315 may be soft decision bits that may include reliability information. Viterbi decoder 315 may use the reliability information to make a hard determination of the bits of each bit pair.

In one implementation, tone detection unit 305 may be configured to determine which frequency components of a number of expected frequency components (e.g., 400 Hz, 600 Hz, 800 Hz, and 1000 Hz) are present in the received signal using a variety of methods. In addition, tone detection unit 305 may calculate an energy value associated with the amplitude of each of the expected frequency components. Tone detection unit 305 may also calculate a ratio of the energy of the largest amplitude frequency component to the total energy in the received signal to generate a reliability value. For example, in one embodiment, the reliability value may correspond to the energy ratio. Tone detection unit 305 may determine that the frequency component associated with the largest energy value is the received tone. Tone detection unit 305 may generate the soft decision by mapping the tone to the appropriate bit pair and the corresponding reliability value. For example, a soft decision representing 600 Hz with a reliability of 70% may be represented as (+0.7, −0.7). The sign of the number may represent a bit value of 0 or 1. In one implementation, a 0 soft decision may be represented by a (+ reliability value) and a 1 soft decision may be represented as a (− reliability value).

In the illustrated embodiment, tone detection unit 305 is also configured to receive a BFI signal that, when asserted, indicates that the data received by channel decoder 201 may have uncorrectable errors or could otherwise not be decoded, for example. In such a case, the speech samples in PCM buffer 301 may be unusable. Accordingly, in response to receiving an asserted BFI signal, in one embodiment, tone detection unit 305 may be configured to output predetermined information to Viterbi decoder 315. For example, as described above, when detecting the CTM tones, the tone detection unit 305 may provide soft decisions that include a reliability value. However, in response to receiving a BFI signal, in one embodiment, the soft decision include a reliability value that may be zero or near zero (e.g., a number that is small enough that it may be interpreted by Viterbi decoder 315 as a 0% reliability decision). For example, in response to an asserted BFI signal, tone detection unit 305 may generate a value such as (+0.01, +0.02) or (−0.01, −0.02) or any combination of plus and minus signs, since the bit value may be ignored by Viterbi decoder 315 due to the very small reliability value. Thus, the reliability value is predetermined and thus independent of any received text telephone symbols. It is noted that in other embodiments, tone detection unit 305 may provide other values to indicate a near-zero reliability in response to an asserted BFI signal.

In one embodiment, Viterbi decoder 315 may use the predetermined information to attempt to determine the value of the bit pair. Since text telephone character bits may be encoded using a convolutional code, depending on the number of bad frames received and thus how long the BFI signal is asserted, Viterbi decoder 315 may be capable of using the 0% reliability information to generate correct bit pairs.

However, in one embodiment, if the BFI signal is asserted for a long time, Viterbi decoder 315 may generate "best guess" bit pairs that may produce erroneous characters for display. Although it is noted that the number of erroneously displayed characters may be small. However, in other embodiments, if the BFI signal is asserted for a long time, Viterbi decoder 315 may generate predetermined bit pairs that may correspond to a predetermined character such as an asterisk or a space, for example.

Figure 4:
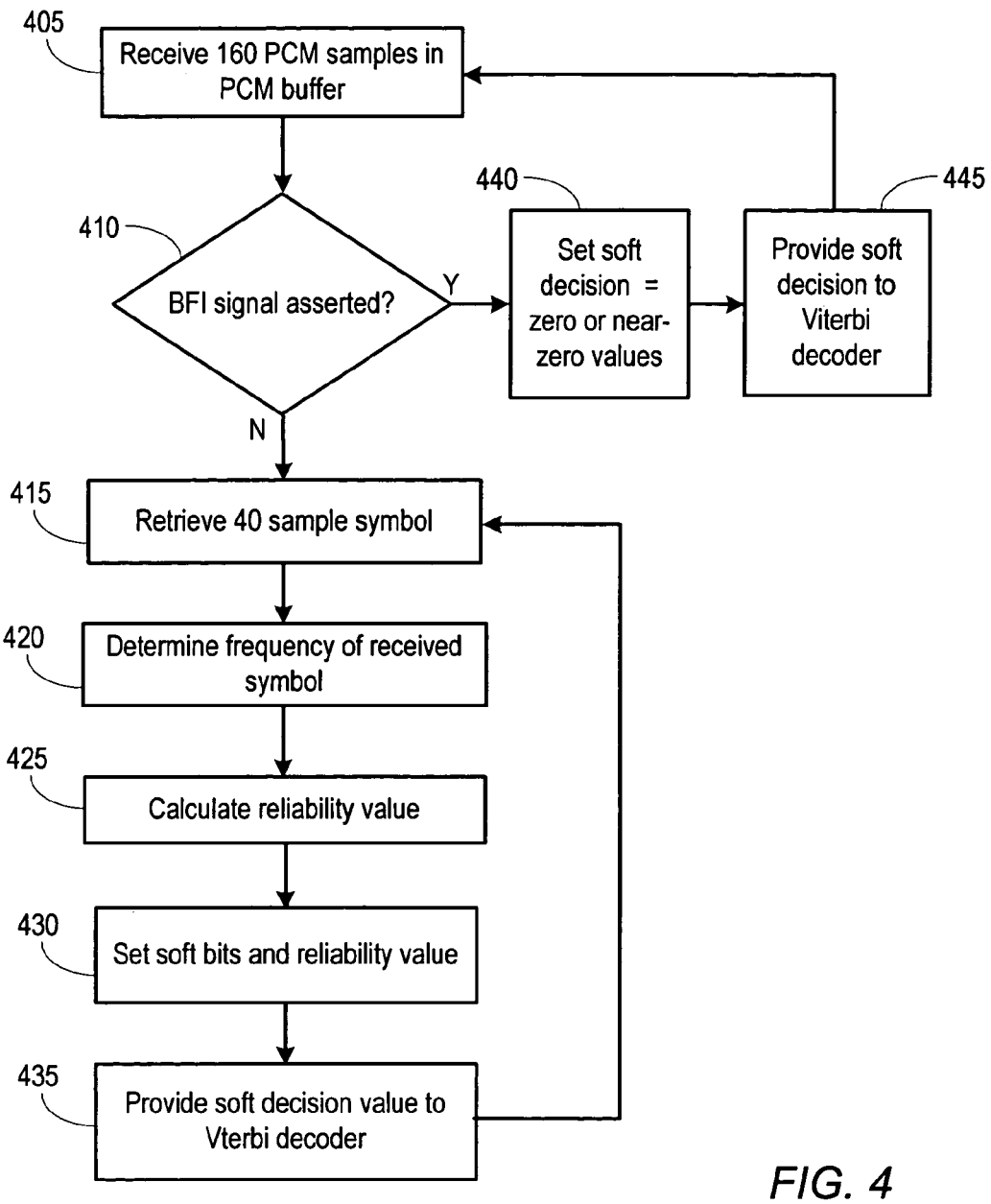
FIG. 4 is a flow diagram describing the operation of one embodiment of the CTM receiver shown in FIG. 3.

FIG. 4 is a flow diagram describing the operation of one embodiment of the CTM receiver shown in FIG. 3. Referring collectively to FIG. 1 through FIG. 4, in one embodiment, PCM buffer 301 receives and stores 160 PCM audio samples that may correspond to four, 40-sample CTM symbols (block 405). As noted above, in certain cases uncorrectable errors or signal distortion may cause the channel decoder 210 to be unable to decode the incoming data. Accordingly, channel decoder 210 may assert the BFI signal to indicate that the data is unusable.

If the BFI signal is not asserted (block 410), such as may be the case during reception of a usable signal, tone detection unit 305 may retrieve a 40-sample CTM symbol from PCM buffer 301 (block 415). Tone detection unit 305 determines the frequency of the received symbol (block 420), and calculates an energy value and a reliability value associated with the frequency of the tone (block 425). Tone detection unit 305 generates the corresponding soft decision bit pair including the reliability value (block 430). Tone detection unit 305 provides the soft decision bit pair and reliability value to the Viterbi decoder 315 (block 435). Operation proceeds as described above in block 415, where another 40-sample CTM symbol may be retrieved from PCM buffer 301.

Referring back to block 410, if the BFI signal is asserted, tone detection unit 305 may not retrieve a 40-sample CTM symbol from PCM buffer 301 as the samples may be unusable. Instead, in response to the asserted BFI signal, tone detection unit 305 may generate a predetermined soft decision bit pair and a corresponding reliability value. For example, in one embodiment the soft decisions for both bits may be set to 0, which may correspond to a 0% reliability (block 440). However, as described above, other numbers other than zero may be used. For example, 0.1 or some other near zero value may be used to indicate the absence of any confidence in the decision. This predetermined information may be provided to the Viterbi decoder 315 (block 445). Operation may proceed as described above in block 405. It is noted that tone detection unit 305 may continue to output the predetermined information as long as the BFI signal is asserted.

It is noted that although the above embodiments have been described in the context of demodulating text telephone characters into symbols that correspond to CTM tones, it is contemplated that the apparatus and methods described above may be used to demodulate any text telephone characters into symbols that correspond to tones other than CTM tones. More particularly, in other embodiments, a demodulator circuit such as CTM modulator 325 may be configured to provide predetermined information corresponding to other types of text telephone symbols in response to an asserted (BFI) signal.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A communication apparatus comprising:
   a receiver including a demodulator unit configured to receive a signal including a plurality of text telephone symbols;
   wherein the demodulator unit is configured to generate a soft decision based upon a frequency and an energy value of each received text telephone symbol; and
   wherein the demodulator unit is configured to receive a notification that indicates the signal is unstable and in response to receiving the notification, the demodulator unit is further configured to generate predetermined information that is independent of the plurality of text telephone symbols.

2. The communication apparatus as recited in claim 1, wherein the predetermined information is soft decision information including a reliability value that does not correspond to a received text telephone symbol.

3. The communication apparatus as recited in claim 2, wherein the predetermined soft decision information includes a reliability value that is interpreted to be zero percent reliable.

4. The communication apparatus as recited in claim 2, wherein the demodulator unit is further configured to provide the predetermined soft decision information for decoding by a convolutional decoder.

5. The communication apparatus as recited in claim 1, wherein the demodulator unit is further configured to determine an amplitude corresponding to frequency components of each received text telephone symbol included in the signal.

6. The communication apparatus as recited in claim 5, wherein the demodulator unit is further configured to calculate a respective energy value associated with each frequency component of each received text telephone symbol.

7. The communication apparatus as recited in claim 6, wherein the demodulator unit is further configured to calculate a ratio of an energy associated with a frequency having a largest amplitude to a total energy associated with each received text telephone symbol.

8. The communication apparatus as recited in claim 7, wherein the demodulator unit is further configured to generate a pair of soft decision bits that corresponds to the frequency of the received symbol, and wherein the demodulator unit is further configured to assign the soft decision to each of the soft decision bits based upon the value of the ratio.

9. The communication apparatus as recited in claim 1, wherein the demodulator unit is further configured to generate a pair of soft decision bits that corresponds to the frequency of the received symbol, wherein each soft decision bit has a bit value.

10. The communication apparatus as recited in claim 1, wherein each text telephone symbol includes a plurality of bits encoded according to a cellular text telephone modem (CTM) protocol, wherein each symbol is a bit pair represented by a 40-sample sinusoid at one of 400 Hz, 600 Hz, 800 Hz, and 1000 Hz.

11. A method comprising:
    receiving a signal including a plurality of text telephone symbols;
    generating a soft decision based upon a frequency and an energy value of each received text telephone symbol; and
    generating predetermined information that is independent of the plurality of text telephone symbols in response to receiving a notification that indicates the signal is unusable.

12. The method as recited in claim 11, wherein the predetermined information is soft decision information including a reliability value that does not correspond to a received text telephone symbol.

13. The method as recited in claim 12, wherein the predetermined soft decision information includes a reliability value that is interpreted to be zero percent reliable.

14. The method as recited in claim 12, further comprising providing the predetermined soft decision information for decoding by a convolutional decoder.

15. The method as recited in claim 11, further comprising determining an amplitude corresponding to frequency components of each received text telephone symbol included in the signal.

16. The method as recited in claim 15, further comprising calculating a respective energy value associated with each frequency component of each received text telephone symbol.

17. The method as recited in claim 16, further comprising calculating a ratio of an energy associated with a frequency having a largest amplitude to a total energy associated with each received text telephone symbol.

18. The method as recited in claim 17, further comprising generating a pair of soft decision bits that corresponds to the frequency of the received symbol, and assigning the soft decision to each of the soft decision bits based upon the value of the ratio.

19. The method as recited in claim 11, further comprising generating a pair of soft decision bits that corresponds to the frequency of the received symbol, wherein each soft decision bit has a bit value.

20. The method as recited in claim 11, further comprising generating each symbol of the plurality of text telephone symbols according to a cellular text telephone modem (CTM) protocol, wherein each text telephone symbol is a bit pair represented by a sinusoid at one of 400 Hz, 600 Hz, 800 Hz, and 1000 Hz.

* * * * *